United States Patent [19]

Muller

[11] Patent Number: 5,561,711
[45] Date of Patent: Oct. 1, 1996

[54] PREDICTIVE CALLING SCHEDULING SYSTEM AND METHOD

[75] Inventor: Michael J. Muller, Boulder, Colo.

[73] Assignee: US West Technologies, Inc., Boulder, Colo.

[21] Appl. No.: 208,767

[22] Filed: Mar. 9, 1994

[51] Int. Cl.⁶ ............... H04M 3/00; G06F 15/36
[52] U.S. Cl. ............ 379/266; 379/218; 379/265; 379/213
[58] Field of Search ............... 379/218, 266, 379/265, 309, 67, 88, 84, 213, 214

[56] References Cited

U.S. PATENT DOCUMENTS

| 4,829,563 | 5/1989 | Crockett | 379/309 |
|---|---|---|---|
| 4,858,120 | 8/1989 | Samuelson | 379/401 |
| 4,881,261 | 11/1989 | Oliphant | 379/215 |
| 4,933,964 | 6/1990 | Girgis | 379/67 |
| 5,155,763 | 10/1992 | Bigus | 379/113 |
| 5,164,981 | 11/1992 | Mitchell | 379/88 |
| 5,179,589 | 1/1993 | Syu | 379/265 |
| 5,181,237 | 1/1993 | Dowden et al. | 379/88 |
| 5,206,903 | 4/1993 | Kohler et al. | 379/309 |
| 5,214,688 | 5/1993 | Szlam | 379/67 |
| 5,214,689 | 5/1993 | O'Sullivan | 379/88 |
| 5,218,676 | 6/1993 | Ben-Ayed et al. | 395/200 |
| 5,247,569 | 9/1993 | Cave | 379/113 |
| 5,249,221 | 9/1993 | Ketring | 379/214 |

Primary Examiner—Krista M. Zele
Assistant Examiner—Thomas F. Presson
Attorney, Agent, or Firm—Brooks & Kushman

[57] ABSTRACT

A predictive scheduling system and method for assigning a telephone call to a telephone agent. The system includes processing and switching equipment capable of implementing the method steps of generating a plurality of signals representing selected parameters for each of the plurality of agents and for the call, and processing the signals to select an agent, at the time the call is received, to handle the call. The system also implements the method steps of routing the call to an automated dialog system using pre-recorded voice communications from the selected agent, and routing the call to the selected agent.

14 Claims, 3 Drawing Sheets

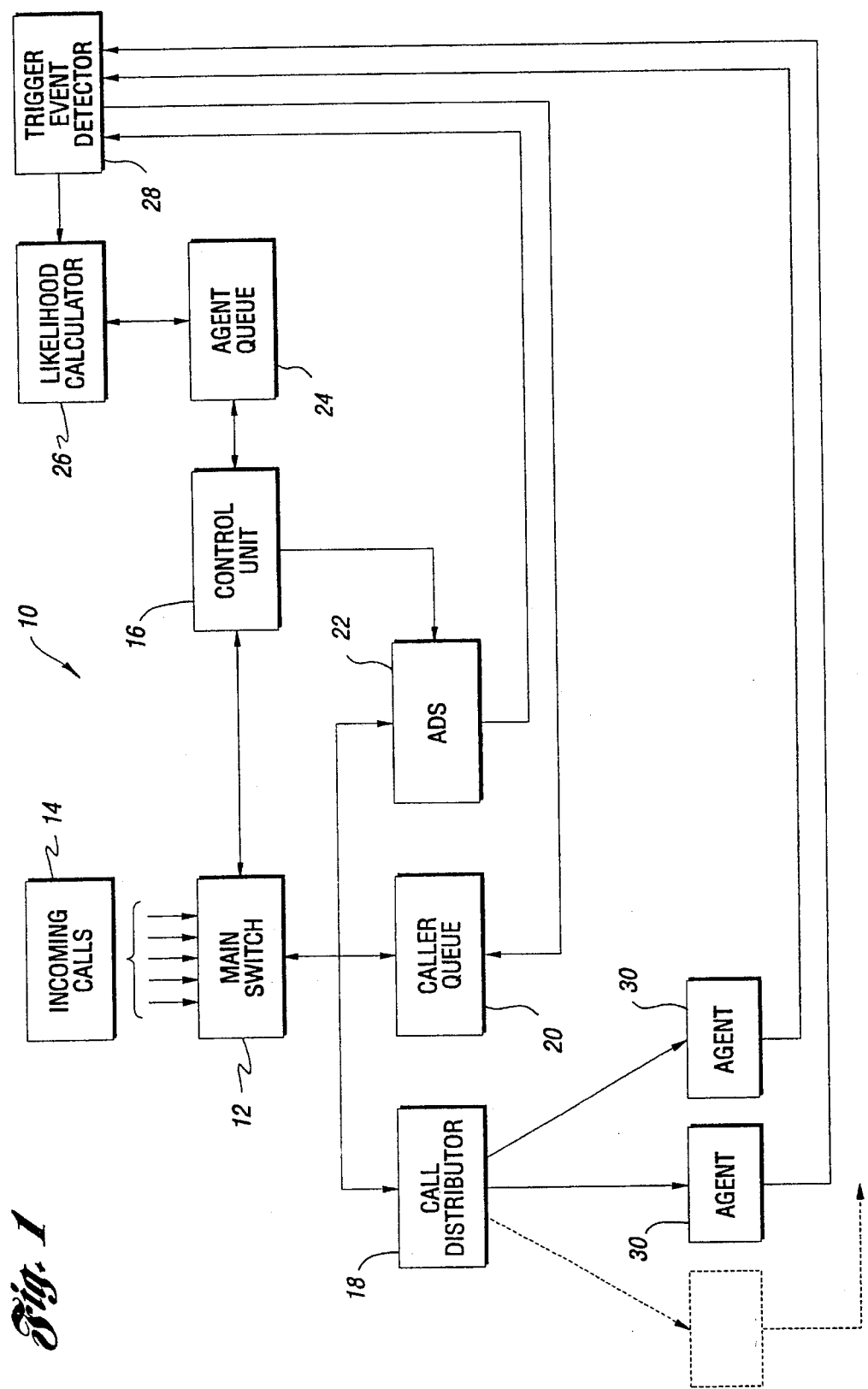

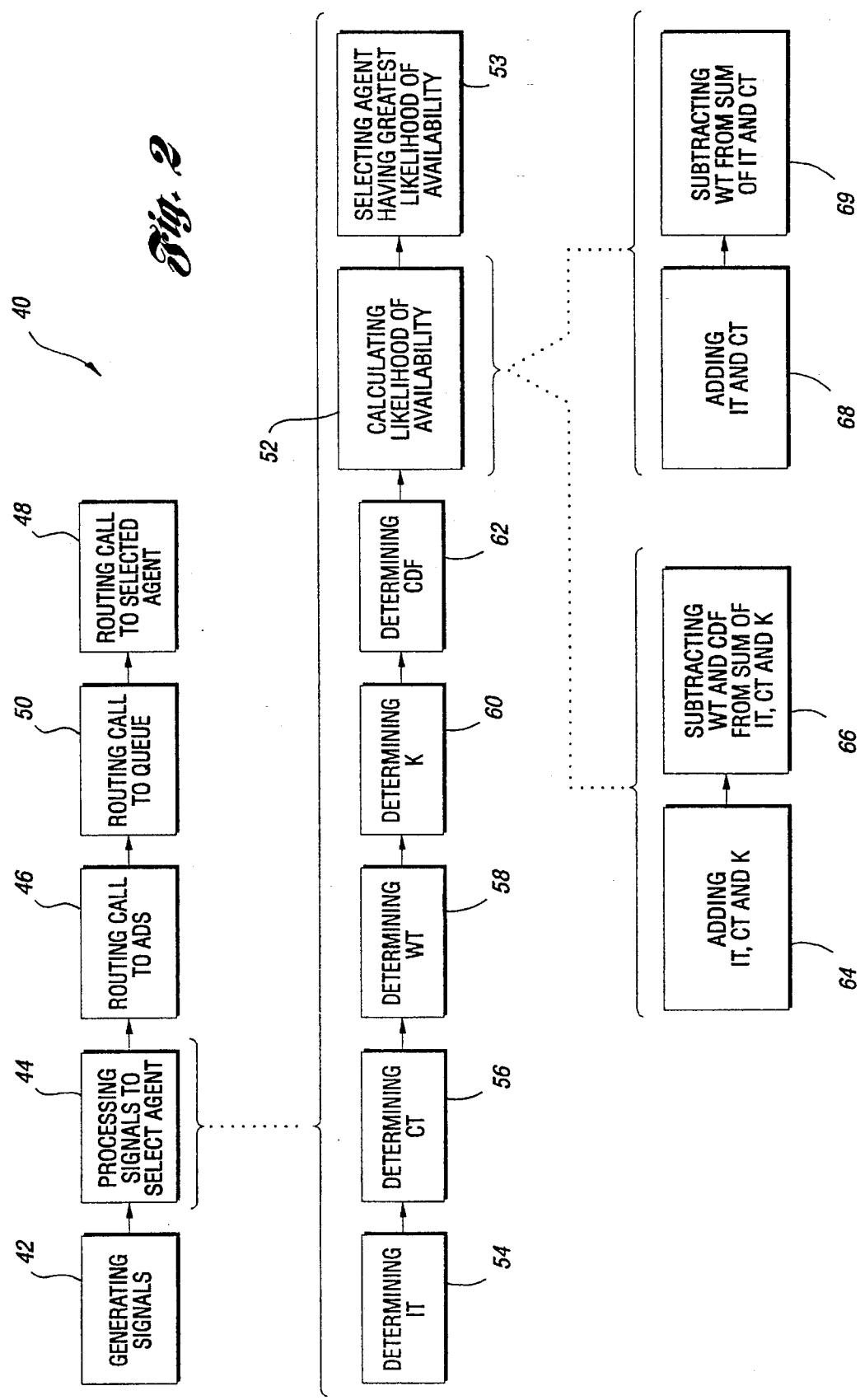

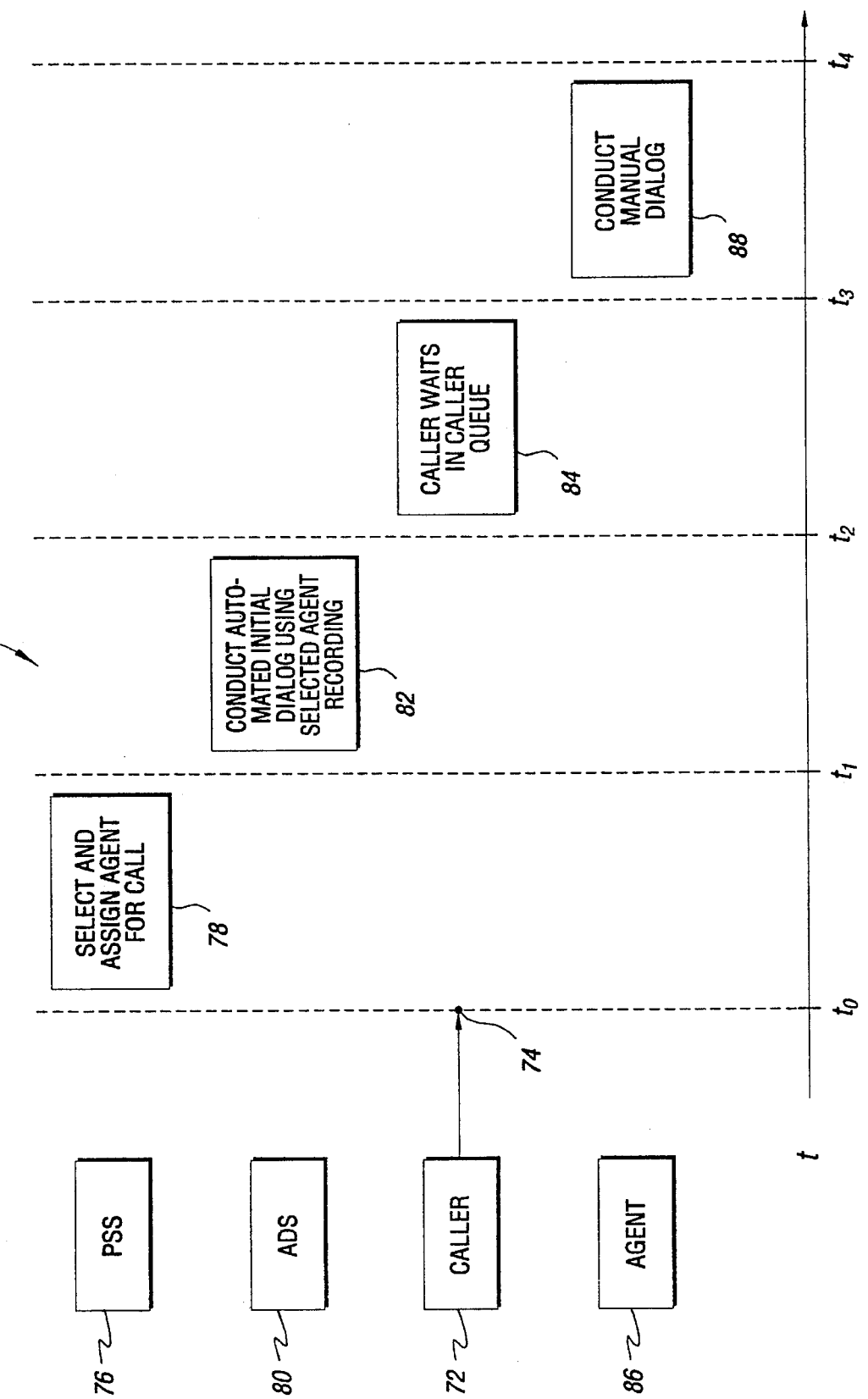

PREDICTIVE CALLING SCHEDULING SYSTEM AND METHOD

TECHNICAL FIELD

This invention relates generally to a system and method for assigning a telephone call to a telephone agent and, more particularly, to a system and method for assigning a telephone call to a telephone agent by predicting the availability of the agent.

BACKGROUND ART

It is increasingly common for businesses to maintain telephone systems specifically designed for processing a wide variety of customer calls, including purchase and service order requests. The ultimate goal of such customer service telephone systems is the efficient processing of such calls, coupled with a high degree of customer satisfaction.

To accomplish this goal, typical customer service telephone systems are designed to receive a plurality of customer calls and to route such calls to a plurality of telephone agents for processing on a first come, first served basis. Additionally, to further improve efficiency, most such customer service telephone systems are either fully or partially automated.

In the typical automated customer service telephone system, upon receipt of a customer call, a number of anonymous recorded voice communications are used to prompt the customer for a variety of information. Such information is then used by the system to process the customer's request automatically, or to route the call to the proper telephone agent for further processing.

One example of such customer service telephone systems is found in U.S. Pat. No. 5,206,903 issued to Kohler et al. and assigned to AT&T Bell Laboratories ("the Kohler '903 patent"). The Kohler '903 patent discloses a method and apparatus for automatic call distribution. The method and apparatus of the Kohler '903 patent distribute incoming calls to telephone agents by matching the information needs of the caller with the particular expertise of an agent.

More specifically, in the method and apparatus of the Kohler '903 patent, each incoming call is assigned prioritized skill numbers that estimate the skill requirements of the caller. Telephone agents are also assigned skill numbers that represent their various particular abilities. After receipt of an incoming call, the method and apparatus of the Kohler '903 patent interrogate the caller to determine the caller's skill requirements. A search is then performed to match the caller's skill requirements with the skills of an available agent, and the call is routed to that agent.

Another example of such customer service telephone systems is found in U.S. Pat. No. 5,181,237 issued to Dowden et al. and also assigned to AT&T Bell Laboratories ("the Dowden '237 patent"). The Dowden '237 patent discloses a method and apparatus for automatically processing operator assistance telephone calls. The method and apparatus of the Dowden '237 patent include an automated operator position including speech recognition and announcement capabilities for interrogating a caller.

The automated operator position of the Dowden '237 patent also includes a control device for transmitting and receiving messages necessary to process the caller's specific requests. The automated operator position still further includes switch capabilities for switching the call to a telephone operator in the event that a situation arises for which the automated operator has not been programmed.

However, customer service telephone systems such as those specifically disclosed in the Kohler '903 and Dowden '237 patents, and those described generally above, still suffer from a variety of problems. Chief among such problems is the high degree of caller dissatisfaction with the automated portions of such systems. More specifically, many callers view automated customer service telephone systems not only as impersonal, but unaccountable as well in that there exists little or no recourse for the caller in the event of system inadequacies or failures.

Nevertheless, automated features in customer service telephone systems are still very desirable to businesses because of the increased efficiency they bring to such systems. As a result, there exists the need for an improved customer service telephone system having automated features that overcomes the type of caller dissatisfaction described above.

DISCLOSURE OF INVENTION

Accordingly, it is an object of the present invention to provide a predictive scheduling system and method that efficiently assigns telephone calls to available telephone agents.

Another object of the present invention is to provide a predictive scheduling system and method that assigns telephone calls to telephone agents based upon the likelihood of availability of the agents.

Another object of the present invention is to provide a predictive scheduling system and method for assigning telephone calls to telephone agents that has automated features using pre-recorded voice communications from the agent selected to process the call at the time the call is received.

According to the present invention, then, a predictive scheduling system and method are provided for assigning a telephone call to one of a plurality of agents. The predictive scheduling system of the present invention comprises means for generating a plurality of signals representing selected parameters for each of the plurality of agents and for the call, and means for processing the signals to select an agent, at the time the call is received, to handle the call. The predictive scheduling system of the present invention further comprises means for routing the call to an automated dialog system which uses pre-recorded voice communications from the selected agent, and means for routing the call to the selected agent.

The predictive scheduling method of the present invention for assigning a telephone call to one of a plurality of agents comprises generating a plurality of signals representing selected parameters for each of the plurality of agents and for the call, and processing the signals to select an agent, at the time the call is received, to handle the call. The predictive scheduling method of the present invention further comprises routing the call to an automated dialog system which uses pre-recorded voice communications from the selected agent, and routing the call to the selected agent.

These and other objects, features and advantages will be readily apparent from the following detailed description of the best mode for carrying out the invention when taken in connection with the accompanying drawings.

BRIEF DESCRIPTION OF DRAWINGS

FIG. 1 is a block diagram of the system of the present invention;

FIG. 2 is a block diagram of the method of the present invention; and

FIG. 3 is timing diagram for the system and method of the present invention.

BEST MODE FOR CARRYING OUT THE INVENTION

With reference to FIG. 1 of the drawings, a block diagram of the system of the present invention for predictive scheduling of telephone calls and telephone agents is shown, designated generally by reference numeral 10. As seen therein, a main switch (12) is provided in communication with a plurality of telephone lines such that the main switch (12) is adapted to receive a plurality of incoming customer calls (14).

Main switch (12) is also provided in communication with a control unit (16), call distributor (18), caller queue (20) and an automated dialog system (ADS) (22). Control unit (16) is also provided in communication with an agent queue (24), which is itself provided in communication with a programmable likelihood calculator (26). Likelihood calculator (26) is further provided in communication with a trigger event detector (28), which is itself provided in communication with ADS (22) and caller queue (20), as well as a plurality of telephone agents (30). Finally, telephone agents (30) are also provided in communication with call distributor (18).

As will be described in greater detail below with reference to FIG. 2 and the method of the present invention for predictive scheduling of telephone calls and telephone agents, main switch (12) signals control unit (16) upon receipt of an incoming customer call (14). Control unit (16) subsequently accesses agent queue (24) to select the agent (30) having the greatest likelihood of availability for handling the call (14).

Control unit (16) thereafter transmits the identification of the agent (30) selected to handle the call (14) to the ADS (22), and signals the main switch (12) to route the call (14) to the ADS (22). ADS (22) then uses the agent identification transmitted by the control unit (16), as well as voice recognition capabilities well known in the art, to conduct an automated initial dialog with the caller using pre-recorded voice communications from the agent (30) selected to handle the call (14). ADS (22) thereby collects various preliminary information from the caller and provides the caller with the identification of the agent (30) that will ultimately handle the call (14). In such a fashion, the present invention maintains the efficiencies achieved by automated customer service telephone systems while also increasing caller satisfaction by personalizing and increasing the accountability of the automated features of the invention.

Upon completion of the ADS (22) dialog, the call (14) may be routed to the caller queue (20) to wait for the availability of the agent (30) selected to handle the call (14). At such time, or alternatively if the agent (30) is immediately available upon completion of the ADS (22) dialog, the call (14) is routed to call distributor (18) and then to the agent (30) selected to handle the call (14).

As previously stated, ADS (22) and agents (30) are provided in communication with trigger event detector (28), which detects a variety of events associated with the agents (30) and call (14). Trigger event detector (28) transmits such event information to likelihood calculator (26), which determines a number of agent (30) and call (14) factors. Likelihood calculator (26) subsequently uses these factors to calculate and continually update the likelihood of availability for handling a call (14) for each of the plurality of agents (30) at the time the call (14) is received by the main switch (12). Trigger event detector (28) also transmits selected event information to caller queue (20) so that a call (14) waiting therein may be routed to call distributor (18) when the agent (30) selected to handle the call (14) becomes available.

From the foregoing description, it can be seen that ADS (22), agents (30) and trigger event detector (28) together comprise means for generating a plurality of signals representing selected parameters for each of the plurality of agents (30) and for the call (14). Similarly, likelihood calculator (26), agent queue (24) and control unit (16) together comprise means for processing the signals to select an agent (30), at the time the call (14) is received, to handle the call (14).

In that same regard, main switch (12) comprises means for routing the call (14) to an ADS (22) which uses pre-recorded voice communications from the selected agent (30), as well as means for routing the call (14) to a caller queue (20) until the agent (30) selected to handle the call (14) becomes available. Likewise, main switch (12) and call distributor (18) together comprise means for routing the call (14) to the selected agent (30). Moreover, as will again be described in greater detail below with reference to FIG. 2 and the method of the present invention, likelihood calculator (26), trigger event detector (28), agents (30) and ADS (22) together variously comprise means for determining a number of agent and call factors, and means for calculating the likelihood of availability for each of the agents based on the plurality of signals representing selected agent and call parameters from which such agent and call factors are determined. Finally, control unit (16) and agent queue (24) comprise means for selecting the agent having, at the time the call is received, the greatest likelihood of availability.

Referring now to FIG. 2, a block diagram of the method the present invention for predictive scheduling of telephone calls and telephone agents is shown, designated generally by reference numeral 40. As seen therein, the method (40) comprises generating (42) a plurality of signals representing selected parameters for each of the plurality of agents and for the call, and processing (44) the signals to select an agent, at the time the call is received, to handle the call.

The method (40) further comprises routing (46) the call to an automated dialog system comprising pre-recorded voice communications from the selected agent, and routing (48) the call to the selected agent. Alternatively, the method may still further comprise, after routing (48) the call to the automated dialog system, routing (50) the call to a caller queue until the selected agent is available. As previously stated, in this fashion the present invention maintains the efficiencies achieved by automated customer service telephone systems while also increasing caller satisfaction by personalizing and increasing the accountability of the automated features of the invention.

Still referring to FIG. 2, processing (44) the signals to select an agent, at the time the call is received, to handle the call itself comprises calculating (52) the likelihood of availability for each of the plurality of agents based on the plurality of signals representing selected parameters for each of the plurality of agents and for the call, as well as selecting (53) the agent having, at the time the call is received, the greatest calculated likelihood of availability. Processing (44) the signals to select an agent, at the time the call is received, to handle the call preferably further comprises determining (54) an agent idle time factor (IT), determining (56) an agent call time factor (CT), determining (58) an agent average work time factor (WT), determining (60) an agent scaling factor (K), and determining (62) a call duration factor (CD). As previously discussed with reference to FIG. 1 and the system (10) of the present invention, likelihood calculator (26), trigger event detector (28), agents (30) and ADS (22) variously comprise means for accomplishing these method (40) steps.

In that regard, referring now to FIGS. 1 and 2, by monitoring agents (30), trigger event detector (28) can signal likelihood calculator (26) when each agent (30) enters or exits the available pool of agents (30), as well as when each agent (30) begins or ends a call (14). Similarly, by monitoring ADS (22), trigger event detector (28) can signal likelihood calculator (26) when a call (14) enters and exits ADS (22).

Using such information, likelihood calculator (26) is able to determine which agents (30) are available for handling calls, the amount of time each agent (30) has been handling a call (14) or has been idle, the average time an agent (30) takes to complete a call (14), and the amount of time the call (14) spent in ADS (22). By multiplying these time periods by appropriate constants, likelihood calculator (26) scales such time periods thereby determining (52, 54, 56, 60) the idle time factor (IT), call time factor (CT), and average work time factor (WT) for each agent (30), as well as the call (14) duration factor (CD). Likelihood calculator (26) may also employ analysis techniques well known to those of ordinary skill in the art for determining (58) the agent scaling factor (K).

Referring again to FIG. 2, calculating (52) the likelihood of availability for each of the plurality of agents itself preferably comprises adding (64) the agent idle time factor (IT), the agent call time factor (CT) and the agent scaling factor (K), and subtracting (66) the agent average work time factor (WT) and the call duration factor (CD) from the sum of the agent idle time factor (IT), the agent call time factor (CT) and the agent scaling factor (K).

In that regard, calculating (52) the likelihood of availability for each of the plurality of agents may be represented mathematically according to the following equation:

$$L=K+IT+CT-WT-CD$$

where, as stated above, L is the likelihood of availability for an individual agent, K is the agent scaling factor, IT is the agent idle time factor, CT is the agent call time factor, WT is the agent average work time factor, and CD is the call duration factor. As previously mentioned, each of these factors, IT, CT, WT and CD, include an appropriate scaling constant.

Alternatively, calculating (52) the likelihood of availability for each of the plurality of agents may be accomplished without regard to one or both of the agent scaling factor (K) and the call duration factor (CD). Calculating (52) the likelihood of availability for each of the plurality of agents thus may comprise adding (68) the agent idle time factor (IT) and the agent call time factor (CT), and subtracting (69) the agent average work time factor (WT) from the sum of the agent idle time factor (IT) and the agent call time factor (CT). As is readily apparent, in that instance, the steps of determining (60) an agent scaling factor (K) and determining (62) a call duration factor (CD) need not be undertaken.

In that instance, calculating (52) the likelihood of availability for each of the plurality of agents may then be represented mathematically according to the alternative equation:

$$L=IT+CT-WT$$

where, again, L is the likelihood of availability for an individual agent, IT is the agent idle time factor, CT is the agent call time factor, and WT is the agent average work time factor. Once again, as previously mentioned, each of these factors, IT, CT and WT, include an appropriate scaling constant.

Referring finally to FIG. 3, a timing diagram for the system (10) and method (40) of the present invention is shown, designated generally by reference numeral 70. As seen therein, at time $t_0$, caller (72) places a call (74). In response thereto, the predictive scheduling system (76) selects and assigns (78) an agent for handling the call.

At time $t_1$, the call is routed to ADS (80), which conducts an automated initial dialog (82) with the caller (72) using pre-recorded voice communications from the agent previously selected to handle the call. If, at time $t_2$, when the automated dialog ends, the agent selected to handle the call is not yet available, the call is routed to a caller queue where the caller (72) waits until the agent selected to handle the call is available (84). Finally, at time $t_3$, when the agent selected to handle the call is available, the call is routed to the agent (86) who then conducts (88) a manual dialog with the caller (72) until time $t_4$ when the call is terminated.

From the foregoing description, it is readily apparent that the present invention provides a predictive scheduling system (10) and method (40) that efficiently assign telephone calls to available telephone agents based upon the likelihood of availability of the agents. Moreover, the present invention also provides a predictive scheduling system (10) and method (40) for assigning telephone calls to telephone agents that employ automated features using pre-recorded voice communications from the agent selected to process the call at the time the call is received, thereby increasing caller satisfaction by personalizing and increasing the accountability of such automated features.

The predictive scheduling system (10) and method (40) of the present invention have been described and shown herein in conjunction with the selection of agents for handling calls based upon the likelihood of availability of the agents. However, it should be readily apparent that the system (10) and method (40) of the present invention are suitable for use in any application wherein selection of agents for handling calls based on any type of parameters may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A predictive scheduling method for assigning a telephone call to one of the plurality of telephone agents, the method comprising:

generating a plurality of signals representing selective parameters for each of the plurality of agents and for the call;

processing the signals to select an agent to handle the call, said processing including calculating the likelihood of availability for each of the plurality of agents based on the plurality of signals representing the selected parameters for each of the plurality of agents and for the call, said calculating including continually updating the likelihood of availability for handling a call, and selecting the agent having, at the time the call is received, the greatest calculated likelihood of availability;

routing the call to an automated dialog system comprising pre-recorded voice communications from the selected agent; and routing the call to the selected agent.

2. The method of claim 1 further comprising, after routing the call to the automated dialog system, routing the call to a caller queue until the selected agent is available.

3. The method of claim 1 wherein processing the signals further comprises:

determining an agent idle time factor;

determining an agent call time factor; and determining an agent average work time factor.

4. The method of claim 3 wherein processing the signals further comprises:

determining an agent scaling factor; and determining a call duration factor.

5. The method of claim 3 wherein calculating the likelihood of availability for each of the plurality of agents comprises:

adding the agent idle time factor and the agent call time factor; and subtracting the agent average work time factor from the sum of the agent idle time factor and the agent call time factor.

6. The method of claim 4 wherein calculating the likelihood of availability for each of the plurality of agents comprises:

adding the agent idle time factor, the agent call time factor and the agent scaling factor; and subtracting the agent average work time factor and the call duration factor from the sum of the agent idle time factor, the agent call time factor and the agent scaling factor.

7. The method of claim 1 wherein processing the signals comprises:

estimating the duration of a first portion of the call handled by the automated dialog system;

predicting, in advance of the automated dialog system portion of the call, the identity of one of the plurality of agents to handle the call based on the estimated duration of the automated dialog system portion of the call;

assigning the call to the identified agent in advance of the automated dialog system portion of the call based on the identity of the one of a plurality of telephone agents predicted;

generating the automated dialog system portion of the call using pre-recorded voice communications from the identified agent.

8. A predictive scheduling system for assigning a telephone call to one of a plurality of telephone agents, the system comprising:

means for generating a plurality of signals representing selected parameters for each of the plurality of agents and for the call;

means for processing the signal to select an agent to handle the call, said processing means including means for calculating the likelihood of availability for each of the plurality of agents based on the plurality of signals representing selected parameters for each of the plurality of agents and for the call, said calculating means including means for continually updating the likelihood of availability for handling a call, and means for selecting the agent having, at the time the call is received, the greatest calculated likelihood of availability;

means for routing the call to an automated dialog system comprising pre-recorded voice communications from the selected agent; and means for routing the call to the selected agent.

9. The system of claim 8 further comprising means for routing the call to a caller queue until the selected agent is available.

10. The system of claim 8 wherein the means for processing the signals further comprises:

means for determining an agent idle time factor;

means for determining an agent call time factor; and means for determining an agent average work time factor.

11. The system of claim 10 wherein the means for processing the signals further comprises:

means for determining an agent scaling factor; and means for determining a call duration factor.

12. The system of claim 10 wherein the means for calculating the likelihood of availability for each of the plurality of agents comprises:

means for adding the agent idle time factor and the agent call time factor; and means for subtracting the agent average work time factor from the sum of the agent idle time factor and the agent call time factor.

13. The system of claim 11 wherein the means for calculating the likelihood of availability for each of the plurality of agents comprises:

means for adding the agent idle time factor, the agent call time factor and the agent scaling factor; and means for subtracting the agent average work time factor and the call duration factor from the sum of the agent idle time factor, the agent call time factor and the agent scaling factor.

14. The system of claim 8 wherein the means for processing the signals comprises:

means for estimating the duration of a first portion of the call handled by the automated dialog system;

means for predicting, in advance of the automated dialog system portion of the call, the identity of one of the plurality of agents to handle the call based on the estimated duration of the automated dialog system portion of the call;

means for assigning the call to the identified agent in advance of the automated dialog system portion of the call based on the identity of the one of a plurality of telephone agents predicted;

means for generating the automated dialog system portion of the call using pre-recorded voice communications from the identified agent.

* * * * *